Figure 1:
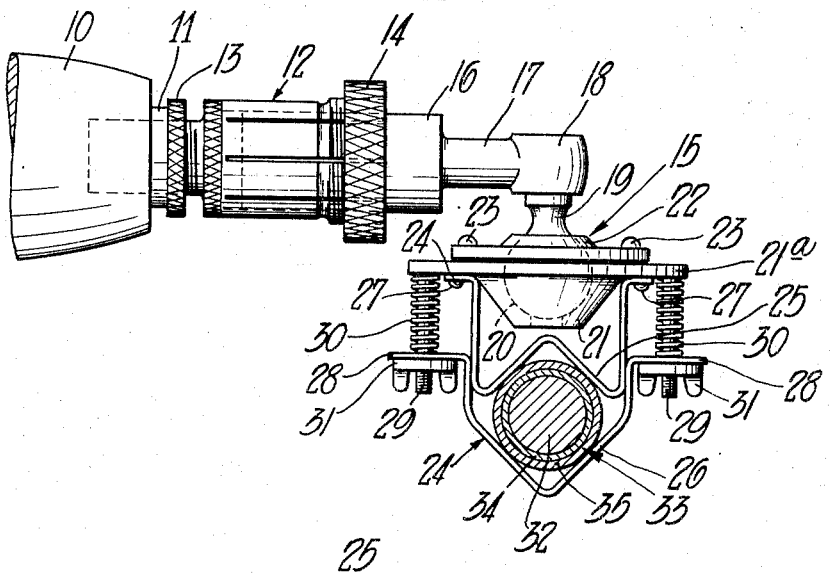

July 24, 1951    M. LUX    2,561,523

TOOL-MANIPULATOR ATTACHMENT FOR ARTIFICIAL ARMS

Filed July 15, 1948

Inventor:
MICHAEL LUX,
by: Donald G. Dalton
his Attorney.

Patented July 24, 1951

2,561,523

UNITED STATES PATENT OFFICE 2,561,523

TOOL-MANIPULATOR ATTACHMENT FOR ARTIFICIAL ARMS

Michael Lux, Clairton, Pa.

Application July 15, 1948, Serial No. 38,814

2 Claims. (Cl. 3—12)

This invention relates to an attachment for an artificial arm and, in particular, to a manipulator adapted to permit the use of a hand tool or implement such as a rake, broom, pitchfork or the like, having a handle.

Known artificial-arm attachments necessitate excessive arm or body movements in the performance of simple tasks, such as manipulating hand tools or implements. It is accordingly the primary object of my invention to permit nearly normal use of simple hand tools by a wearer of an artificial arm, without undue effort.

A further object of the invention is to provide an improved tool manipulator capable of effecting a movement similar to that of the hand on rotation of the wrist and thereby exerting a thrusting, lifting or pulling force on a tool handle. A still further object is to provide a manipulator permitting free rotation of the tool handle through 360° or more.

Many forms of light manual labor involve the use of a tool having a handle. Among them are raking, sweeping, hoeing, washing show windows, pitching hay, pruning trees and the like. Such work could be performed by wearers of an artificial arm but for the lack of a satisfactory attachment for engagement with the implement handle. I have invented an attachment of this type which gives the wearer of an artificial arm almost the manipulative ability of the missing hand, at least for the types of work mentioned. At the same time, my improved manipulator attachment is simple, light in weight and easily operated to exert a working grip on an implement handle.

In a preferred embodiment, I provide a manipulator including a shank adapted to be received in a chuck at the end of the arm, having a supporting joint member extending therefrom generally normal thereto. A second joint member is articulated with the first and has manually operated clamping or gripping means thereon. A bushing or adapter fitted on a tool handle has a sleeve rotatable thereon adapted to be engaged by the gripping means. The joint members are of a type permitting universal movement of the gripping means relative to the shank.

A complete understanding of the invention may be obtained from the following detailed description which refers to the accompanying drawings illustrating the present preferred embodiment. In the drawings, Figure 1 is an elevation of my improved manipulator showing a tool handle gripped thereby in section; and Figure 2 is an elevation partly broken away showing the bushing or adapter on a tool handle.

Figure 2:
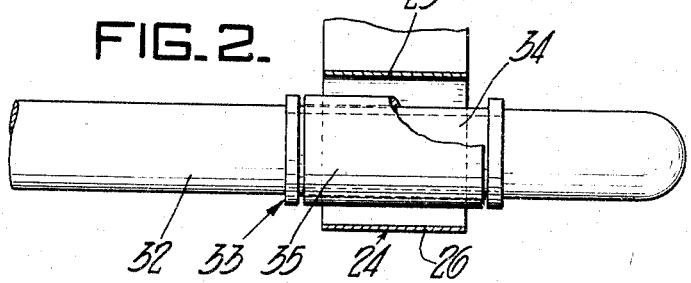

Referring in detail to the drawings and, for the present, to Figure 1, the outer end of an artificial arm 10 is provided with a boss 11 tapped to receive the threaded stud of a chuck 12. A lock nut 13 prevents unscrewing of the chuck stud after it has been turned into the boss 11. The chuck 12 may be of any suitable type providing a cylindrical or polygonal socket and having a nut 14 effective to contract the socket about a member inserted therein, to secure a frictional grip. The chuck body may conveniently be cylindrical and have slots extending longitudinally thereof from the outer end to permit contraction.

My improved manipulator attachment, indicated generally at 15, comprises a shank 16 adapted to be inserted in the chuck 12 and gripped thereby when the nut 14 is turned down. The outer end of the shank is reduced, as at 17, and terminates in a head 18. A supporting member 19 extends laterally from the head 18 being positioned generally normal to the shank. The supporting member constitutes one element of an articulated joint. In the embodiment illustrated, it includes the ball 20 of a ball-and-socket joint, the socket being formed by a separate cup member 21 having a peripheral flange 21ª and a collar 22 secured thereto by screws 23. The supporting or joint member 19 is made separately from the shank 16 but is rigid therewith. It may, for example, have a threaded end screwed into a tapped hole in the head 18.

The cup member 21 of the ball-and-socket joint has a clamping means 24 mounted thereon. This clamping means includes a stationary yoke 25 of V-shape secured to the member 21 by screws 27. A movable yoke 26 cooperates with the yoke 25 for frictionally engaging a member disposed therebetween. The movable yoke 26 has outturned ends 28. These ends have holes or slots therein to accommodate guide studs 29 extending downwardly from the flange 21ª of the member 21. Compression springs 30 on the studs 29 normally urge the movable yoke 26 away from the fixed yoke 25. Wing nuts 31 turned on the studs 29 permit the yoke 26 to be drawn toward the yoke 25, thereby obtaining a firm grip on a member such as a tool handle 32 disposed therebetween. It will be understood that the nuts 31 should be turned down successively a few turns at a time, in order to maintain the yoke 26 in substantially the position illustrated relative to the yoke 25 to insure proper clamping or gripping.

From what has been said, it will be apparent that the clamping or gripping means 24 is adapted to take a grip on the handle of a hand tool or implement 32. To facilitate the manipulation of the tool when so engaged, I provide the handle with an adapter 33. The adapter comprises a bushing 34 fitted on the handle 32 and a sleeve 35 freely rotatable on the bushing but confined against longitudinal movement thereon between flanges or shoulders adjacent the ends of the bushing. The bushing may be permanently mounted on the tool handle, as indicated in Figure 2, or may be releasably secured thereto. In the latter event, the bushing should fit snugly on the handle to insure frictional engagement or be split longitudinally and provided with contracting screws for temporarily clamping it to the handle. In either case, it will be evident that when the sleeve 35 is engaged by the yokes 25 and 26 of the clamping or gripping means, the tool may be freely rotated through 360° or more, without bodily turning the attachment 15.

The attachment of my invention gives the wearer of an artificial arm almost normal capability in respect to thrusting, lifting or pulling forces in executing which a person with both hand relies largely on wrist movement. That is to say, by the aid of the invention, the user thereof, by turning his arm, effects angular movement of the supporting member 19 and is thus able to exert a push or pull longitudinally of a tool handle from a position on one side thereof, i. e., the normal manner of using most tools or implements. In such movement, the ball-and-socket joint operates in the same manner as the wrist of a normal forearm. At the same time, of course, upward or downward forces may be applied directly to the tool handle by the attachment. Free rotation of the tool handle by the user's other hand permits the accurate manipulation of the tool as necessary in certain work, e. g., shovelling or pitching hay. The attachment makes it possible for the user to exert a guiding and supplementary force through his artificial arm while exerting the major working force with his good arm. The location of the adapter 33 on the tool handle, of course, will vary depending on which arm has been amputated and whether the individual is right-handed or left-handed.

The principal advantages of the invention will be readily understood from the foregoing. The position of the supporting member 19 at an angle to the shank 16 permits the user to effect a movement closely similar to that of a normal wrist and hand. The adapter, furthermore, permits rotation of the tool about its longitudinal axis as well as the application of manipulating forces longitudinally or transversely. The tool is thus entirely free for manipulation under the control of the user's good arm but full use of the artificial arm is secured in assisting or guiding movement of the tool. In addition, my improved attachment has advantages in its simplicity of construction, light weight, and the relatively low cost at which it may be manufactured. The mounting of the attachment on the artificial arm or its removal therefrom, as well as the securing of the clamping means to a tool handle and the detachment thereof, may readily be effected by the user's good hand.

Although I have illustrated and described but a preferred embodiment of the invention, it will be recognized that changes in the details and arrangement may be made without departing from the spirit of the invention or the scope of the appended claims.

I claim:

1. A tool-manipulator attachment for an artificial arm comprising a shank adapted to be attached to the arm in alinement therewith, a clamp spaced laterally from said shank adapted to engage a tool handle, and a ball-and-socket joint connecting said shank and clamp, said joint including a ball member, a cup member partially enclosing the ball member, and a collar having an inside diameter less than the diameter of said ball member secured in opposed relation to the cup member and effective to confine the ball member therein, there being sufficient clearance between said collar and said ball member to afford universal movement of the clamp on the shank.

2. The apparatus defined by claim 1 characterized by an adapter, detachably engaged by said clamp, said adapter including a flanged bushing adapted to fit tightly on a tool handle and a sleeve rotatable on said bushing, said clamp directly engaging said sleeve, whereby axial force may be exerted on said handle and simultaneous rotation thereof permitted.

MICHAEL LUX.

REFERENCES CITED

The following references are of record in the file of this patent:

FOREIGN PATENTS

| Number | Country | Date |
|---|---|---|
| 105,656 | Great Britain | Apr. 1, 1917 |
| 384,131 | Germany | Nov. 8, 1923 |
| 541,425 | France | May 2, 1922 |

OTHER REFERENCES

"Artificial Limbs and Amputation Stumps," E. M. Little (1922). A copy is in Div. 55 of the Patent Office, pp. 148, 149, 153, Fig. 161.